United States Patent [19]

Drent et al.

[11] Patent Number: 5,352,765
[45] Date of Patent: Oct. 4, 1994

[54] PREPARATION OF COPOLYMERS OF CARBON MONOXIDE AND OLEFINICALLY UNSATURATED COMPOUNDS

[75] Inventors: Eit Drent; Eric Kragtwijk, both of Amsterdam, Netherlands

[73] Assignee: Shell Oil Company, Houston, Tex.

[21] Appl. No.: 150,933

[22] Filed: Nov. 10, 1993

[30] Foreign Application Priority Data

Nov. 17, 1992 [EP] European Pat. Off. ............ 92203534

[51] Int. Cl.$^5$ .............................................. C08G 67/02
[52] U.S. Cl. ...................................... 528/392; 528/271
[58] Field of Search ................................ 528/271, 392

[56] References Cited

U.S. PATENT DOCUMENTS

| | | | |
|---|---|---|---|
| 4,940,774 | 7/1990 | Wong | 528/392 |
| 5,229,475 | 7/1993 | Drent | 528/392 |

FOREIGN PATENT DOCUMENTS 0460743  5/1991  .

Primary Examiner—John Kight, III
Assistant Examiner—Shelley A. Dodson
Attorney, Agent, or Firm—James O. Okorafor

[57] ABSTRACT

A process for the preparation of copolymers of carbon monoxide and olefinically unsaturated compounds in the presence of an aprotic solvent and a catalyst system consisting essentially of:

(a) a Group VIII metal,
(b) an acid or an anion thereof having a pKa of less than 2, and
(c) a phosphorus bidentate ligand of the general formula $R^1R^2P\text{-}R\text{-}P\text{-}R^1R^2$, wherein $R^1$ and $R^2$ represent identical or different aliphatic alkyl groups and R is a divalent organic bridging group containing at least two carbon atoms in the bridge connecting the two phosphorus atoms, wherein the copolymerization is carried out in the additional presence of hydrogen, while the molar ratio of catalyst component (c) to catalyst component (a) is in the range of from 1 to 10.

10 Claims, No Drawings

PREPARATION OF COPOLYMERS OF CARBON MONOXIDE AND OLEFINICALLY UNSATURATED COMPOUNDS

BACKGROUND OF THE INVENTION

The invention relates to a process for the preparation of copolymers of carbon monoxide and olefinically unsaturated compounds.

European Patent Application No. 0,460,743 discloses a process for the preparation of copolymers of carbon monoxide and one or more olefinically unsaturated compounds, which process comprises contacting the monomers at an elevated temperature and pressure in the presence of hydrogen and one or more aprotic polar diluents, such as tetrahydrofuran (THF) or methyl ethyl ketone. The most suitable catalyst is a catalyst composition comprising a Group VIII metal, preferably palladium, and a phosphorus bidentate ligand. The prior art teaches that this bidentate ligand forms a complex with the Group VIII metal and that the molar ratio of bidentate ligand to Group VIII metal should not exceed 1.5 and preferably should be about 1 in order to obtain optimum activity from the catalyst. Additionally, it was generally believed by those skilled in the art that at bidentate ligand/Group VIII metal molar ratios in excess of 1.5, most or all of the catalytically active sites of the Group VIII metal will form complexes with the phosphorus bidentate ligand. Although this improves the stability of the catalyst composition, it is detrimental to its catalytic activity.

It is an object of the present invention to provide a process for the preparation of copolymers of carbon monoxide and olefinically unsaturated compounds, wherein a stable catalyst composition comprising a Group VIII metal and a phosphorus bidentate ligand is used and wherein the copolymer is prepared at an excellent polymerization rate and with high selectivity.

Surprisingly, it has been found that excellent polymerization rates can be accomplished when using a catalyst composition comprising a phosphorus bidentate ligand and a Group VIII metal in a molar ratio of more than one in the presence of hydrogen.

SUMMARY OF THE INVENTION

Accordingly, the present invention relates to a process for the preparation of copolymers of carbon monoxide and olefinically unsaturated compounds in the presence of an aprotic solvent and a catalyst system consisting essentially of:
(a) a Group VIII metal,
(b) an acid or an anion thereof having a pKa of less than 2, and
(c) a phosphorus bidentate ligand of the general formula $R^1R^2P-R-P-R^1R^2$, wherein $R^1$ and $R^2$ represent identical or different aliphatic alkyl groups and R is a divalent organic bridging group containing at least two carbon atoms in the bridge connecting the two phosphorus atoms,
wherein the copolymerization is carried out in the additional presence of hydrogen, while the molar ratio of catalyst component (c) to catalyst component (a) is in the range of from 1.5 to 10.

DETAILED DESCRIPTION OF THE INVENTION

Generally speaking, any olefinically unsaturated compound can be copolymerized with carbon monoxide according to the process of the present invention. The invention is particularly suitable for copolymerizing carbon monoxide and olefinically unsaturated compounds containing three or more carbon atoms. Hence, suitable unsaturated compounds are α-olefins, such as ethene, propene, 1-butene, 1-hexene, 1-octene, 1-dodecene and 1-hexadecene. However, olefinically unsaturated carboxylic acids, such as 10-undecenoic acid, or derivatives therefrom may also be used as comonomers of carbon monoxide.

It was found that as a result of the previously disclosed process alternating copolymers were prepared.

The solvent in which the copolymerization is conducted must be aprotic and may be polar or apolar. Suitable apolar aprotic solvents include aromatic hydrocarbons such as benzene and toluene. Suitable polar aprotic solvents include aliphatic ketones such as acetone and methyl ketone; aliphatic carboxylic esters such as methyl acetate, ethyl acetate and methyl propionate; linear ethers such as diglyme; and cyclic ethers such as tetrahydrofuran (THF) and dioxan. Preferably, polar aprotic solvents are used with THF and diglyme being most preferred.

The catalyst system to be used consists essentially of:
(a) a Group VIII metal,
(b) an acid or an anion thereof having a pKa of less than 2,
and
(c) a phosphorus bidentate ligand.

The Group VIII metals include the noble metals such as ruthenium, rhodium, palladium, osmium, iridium and platinum, as well as the iron group metals such as iron, cobalt and nickel. Preferably, the Group VIII metal is selected from palladium, nickel and cobalt, with palladium being particularly preferred. The form in which the Group VIII metal is incorporated in the catalyst composition is not particularly relevant, but preferably said Group VIII metal is in the form of a salt of a carboxylic acid with a Group VIII metal acetate being most preferred.

Component (b) of the catalyst system should be derived from an acid having a pKa of less than 2. Examples of such acids are mineral acids such as sulfuric acid and perchloric acid; sulfonic acids such as methanesulfonic acid, trifluoromethane-sulfonic acid and p-toluenesulfonic acid; and halocarboxylic acids such as trichloroacetic acid, difluoroacetic acid and trifluoroacetic acid.

Preferably, trifluoromethanesulfonic acid or trifluoroacetic acid is used and most preferably, trifluoromethanesulfonic acid is used. Said component (b) may be incorporated in the catalyst composition in the form of either an acid or a salt containing the anion of said acid.

The phosphorus bidentate ligands used as component (c) of the catalyst composition are of the general formula $R^1R^2P-R-P-R^1R^2$, wherein $R^1$ and $R^2$ represent identical or different aliphatic alkyl groups, each alkyl group preferably having from 1 to 10, most preferably from 2 to 6, carbon atoms, and R is a divalent organic bridging group containing at least two carbon atoms in the bridge connecting the two phosphorus atoms. Preferably, $R^1$ and $R^2$ are primary alkyl groups such as ethyl, propyl or butyl with ethyl being most preferred. The bridging group R may be any divalent organic group containing at least two carbon atoms. However, those bridging groups containing three or four carbon atoms are preferred. Examples of suitable bridging groups are the —$CH_2$—$CH_2$—$CH_2$— group, the —$CH_2$—$C(CH_3)_2$—$CH_2$— group, the —$CH_2$—$Si(CH_3)_2$—$CH_2$— group, the -$CH_2$—$CH_2$—$CH_2$—$CH_2$ group and the —$CH_2$—$C(CH_3)_2$—$C(CH_3)_2$—$CH_2$— group. A very suitable phosphorus bidentate ligand is 1,3-bis(diethylphosphino)propane.

As already discussed, it was generally accepted up to now that the molar ratio of phosphorus bidentate ligand to Group VIII metal should preferably be less than 1.5 and more preferably about 1, as otherwise the catalytically active sites of the Group VIII metal would be blocked by said bidentate ligand. However, it now has been found that excellent polymerization rates are obtained with said molar ratio being in the range of from 1.5 to 10, preferably from 1.5 to 8, more preferably from 1.8 to 6 and most preferably in the range of from 2 to 5, while conducting the copolymerization in the additional presence of hydrogen. Under these conditions polymerization rates of 600 g/g Group VIII metal/hr or higher are readily accomplished.

One of the essential features of the present invention is the fact that the copolymerization is carried out in the presence of hydrogen. Preferably, the hydrogen partial pressure during the copolymerization process is in the range of from 1 to 50 bar, while a hydrogen partial pressure in the range of from 5 to 40 is preferred. Hydrogen may be added directly as a gas or may be generated in situ, for instance by the water-gas shift reaction. The exact hydrogen partial pressure to be applied is determined by the desired molecular weight of the final copolymer. If a high molecular weight copolymer is desired, the hydrogen partial pressure should be relatively low, while a relatively high hydrogen partial pressure leads to a final copolymer having a low molecular weight due to the terminating effect of hydrogen.

In a preferred embodiment of the present invention, the copolymerization of carbon monoxide and olefinically unsaturated compound is carried out in the additional presence of aprotic compound. Suitable protic compounds are organic acids having a pKa in the range of from 2 to 7, preferably from 4 to 6. Preferred organic acids include carboxylic acids such as benzoic acid, acetic acid, pivalic acid, adipic acid, isobutyric acid and 2,4,6-trimethylbenzoic acid. Other suitable protic compounds are phenols such as pentachlorophenol and pentafluorophenol. Alcohols such as methanol and ethanol may also be used. Carboxylic acids are preferred, more particularly preferred are linear carboxylic acids.

A particularly preferred carboxylic acid is acetic acid. The molar ratio of protic compound to Group VIII metal may vary within wide limits, but preferably is in the range of from about 15 to 10,000, more preferably from 25 to 5000 and most preferably from about 50 to 3500.

The quantity of catalyst composition used for preparing the copolymers of carbon monoxide and the olefinically unsaturated compounds containing at least three carbon atoms may vary over a broad range. Preferably, per mol of olefinically unsaturated compound to be copolymerized, a catalyst composition comprising $10^{-5}$ to $10^{-1}$ millimoles (mmol) and in particular $10^{-4}$ to $10^{-2}$ mmol of Group VIII metal is used.

The copolymerization is preferably carried out at a temperature of from about 25° C. to 150° C., a pressure of from about 2 to 150 bar, while a temperature of from about 30° C. to 130° C. A pressure of from 5 to 100 bar is preferred.

The invention is further illustrated by the following non-limiting examples.

EXAMPLE 1

Into a stirred autoclave with a volume of 300 ml a catalyst solution consisting essentially of:
 50 ml diglyme,
 0.25 mmol palladium acetate,
 1.0 mmol trifluoromethanesulfonic acid, and
 0.6 mmol 1,3-bis(diethylphosphino)-propane was introduced. To this solution was added 260 mmol of 1-octene.

After air was removed from the autoclave, 30 bar of hydrogen and 30 bar of carbon monoxide were forced into the autoclave. The temperature was raised to 60° C. After 1 hour the polymerization was terminated by cooling the reaction mixture to room temperature and releasing the pressure. The polymer was precipitated by adding methanol, filtered, washed with methanol and dried.

20 g copolymer was obtained. The polymerization rate was 800 g copolymer/g Pd/hr.

COMPARATIVE EXAMPLE 1

This comparative example was carried out in substantially the same way as Example 1, but differing in that no hydrogen was added.

No polymer material was formed after 5 hours.

TABLE 1

| EXAMPLES 2-6 AND COMPARATIVE EXAMPLES 2 AND 3* | | | | | |
|---|---|---|---|---|---|
| Example # | Solvent | $H_2$ Partial Pressure (in bars) | CO Partial Pressure (in bars) | RXn Time (in hours) | Amount of Copolymer Produced (in g) | Polymerization Rate** |
| 2 | Acetic Acid (160 mmol) | 10 | 50 | 1.5 | 30 | 900 |
| 3 | Acetic Acid (160 mmol) | 30 | 30 | 0.5 | 17 | 1400 |
| 4 | Acetic Acid (160 mmol) | 1 | 30 | 1.0 | 19 | 750 |
| 5 | Piralic Acid (89 mmol) | 10 | 50 | 2.5 | 19 | 500 |
| 6 | Methanol (237 mmol) | 10 | 50 | 1.5 | 24 | 650 |
| Comp. 2 | Acetic Acid (160 mmol) | 10 | 50 | 5.0 | None | N/A |
| Comp. 3 | Acetic Acid 1,3-bis-diphenyl- | 10 | 50 | 5.0 | None | N/A |

TABLE 1-continued

EXAMPLES 2-6 AND COMPARATIVE EXAMPLES 2 AND 3*

| Example # | Solvent | H$_2$ Partial Pressure (in bars) | CO Partial Pressure (in bars) | RXn Time (in hours) | Amount of Copolymer Produced (in g) | Polymerization Rate** |
|---|---|---|---|---|---|---|
| | phosphino)propane | | | | | |

*Examples 2-6 and Comparative Examples 2 and 3 were carried out using the procedures and ingredients of Example 1 except for the respective variations shown in Table 1.
**In g/copolymer/g/Pd/hr.

EXAMPLE 7

Into a stirred autoclave with a volume of 300 ml a catalyst solution consisting essentially of:
50 ml toluene,
0.1 mmol palladium acetate,
0.5 mmol trifluoromethanesulfonic acid, and
0.25 mmol 1,3-bis(diethylphosphino)propane was introduced.

To this solution was added 160 mmol of acetic acid and mmol of 1-octene.

After air was removed from the autoclave, 10 bar of hydrogen and 50 bar of carbon monoxide were forced into the autoclave. The temperature was raised to 60° C. After 1.5 hours the polymerization was terminated by cooling the reaction mixture to room temperature and releasing the pressure. The polymer was precipitated by adding methanol, filtrated, washed with methanol and dried.

13.5 g copolymer was obtained. The polymerization rate was 900 g copolymer/g Pd/hr.

EXAMPLE 8

A 1-octene/carbon monoxide copolymer was prepared in the same way as in Example 7, but differing in that 147 mmol of 10-undecenoic acid was used as the olefinically unsaturated monomer instead of 1-octene and in that diglyme was used as the solvent and the washing liquid instead of toluene.

22.5 g of copolymer was obtained. The polymerization rate was 1500 g copolymer/g Pd/hr.

EXAMPLE 9

A 1-octene/carbon monoxide copolymer was prepared in the same way as in Example 7, but differing in that 139 mmol of 1-hexadecene was used as the olefinically unsaturated monomer instead of 1-octene and in that tetrahydrofuran was used as the solvent and the washing liquid instead of toluene.

16.5 g of copolymer was obtained. The polymerization rate was 1100 g copolymer/g Pd/hr.

EXAMPLE 10

Into a stirred autoclave with a volume of 300 ml a catalyst solution consisting essentially of:
50 ml THF,
0.1 mmol palladium acetate,
0.5 mmol trifluoromethanesulfonic acid, and
0.3 mmol 1,3-bis(diethylphosphino)propane was introduced. To this solution was added 160 mmol of acetic acid and 740 mmol of propene.

After air was removed from the autoclave, 10 bar of hydrogen and 50 bar of carbon monoxide were forced into the autoclave. The temperature was raised to 60° C. After 0.5 hours the polymerization was terminated by cooling the reaction mixture to room temperature and releasing the pressure. The polymer was precipitated by adding methanol, filtrated, washed with methanol and dried.

12.5 g copolymer was obtained. The polymerization rate was 2500 g copolymer/g Pd/hr.

The experimental results demonstrate that when the molar ratio of catalyst components (c) to (a) is in the range of 1.5 to 10, excellent polymerization rates are obtained.

While this invention has been described in detail for the purpose of illustration, it is not to be construed as limited thereby but is intended to cover all changes and modifications within the spirit and scope thereof.

What is claimed is:

1. A process for the preparation of copolymers of carbon monoxide and olefinically unsaturated compounds in the presence of an aprotic solvent and a catalyst system consisting essentially of:
   (a) a Group VIII metal,
   (b) an acid or an anion thereof having a pKa of less than 2, and
   (c) a phosphorus bidentate ligand of the general formula $R^1R^2P-R-P-R^1R^2$, wherein $R^1$ and $R^2$ represent identical or different aliphatic alkyl groups and R is a divalent organic bridging group containing at least two carbon atoms in the bridge connecting the two phosphorus atoms, characterized in that the copolymerization is carried out in the additional presence of hydrogen, while the molar ratio of catalyst components (c) to (a) is in the range of from above 2 to 10.

2. A process as in claim 1 wherein the hydrogen partial pressure is between 1 and 50 bar.

3. A process as in claim 1 wherein the molar ratio of catalyst component (c) to catalyst component (a) is in the range of from above 2 to 5.

4. A process as in claim 1 wherein said copolymerization is carried out in the additional presence of an organic acidic compound having a pKa in the range of from 2 to 7.

5. A process as in claim 4 wherein said organic acidic compound has a pKa in the range of from 4 to 6.

6. A process as in claim 5 wherein said organic acidic compound is a carboxylic acid.

7. A process as in claim 6 wherein said carboxylic acid is acetic acid.

8. A process as in claim 4 wherein the molar ratio of organic acid to Group VIII metal is in the range of from 15 to 10,000.

9. A process as in claim 8 wherein the molar ratio of organic acid to Group VIII metal is in the range of from 25 to 5000.

10. A process as in claim 9 wherein the molar ratio of organic acid to Group VIII metal is in the range of from 50 to 3500.

* * * * *